Oct. 20, 1936.   E. R. FITCH   2,058,010
GASKET
Filed Aug. 4, 1934
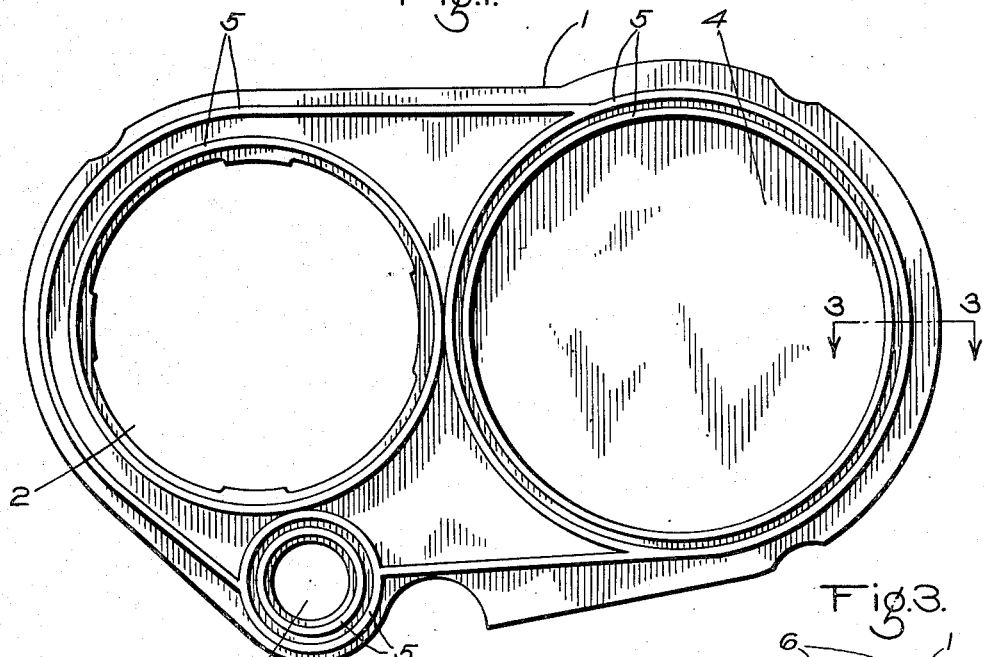
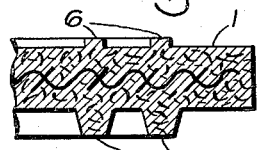
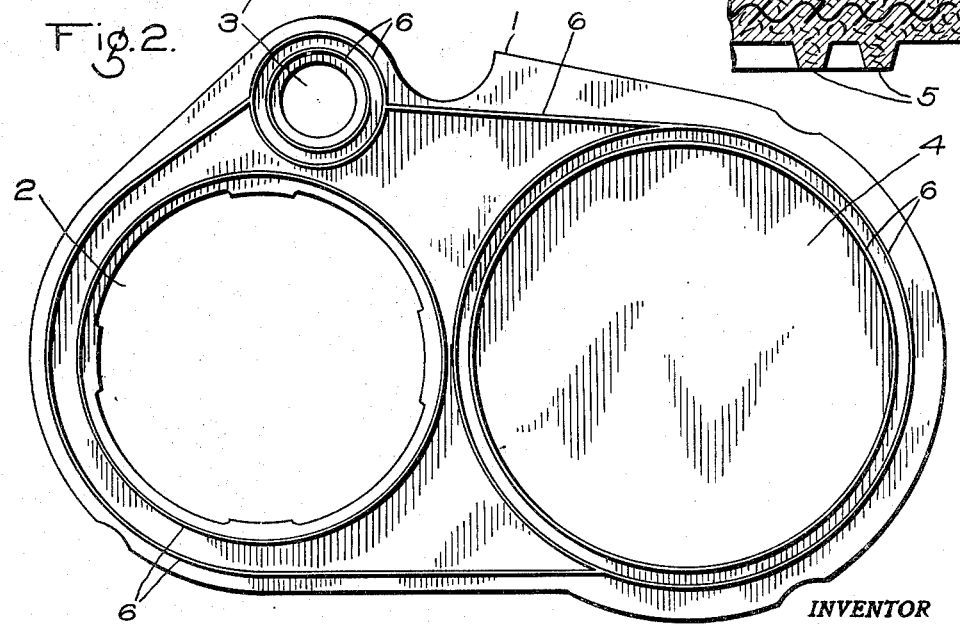
INVENTOR
ELLERY R. FITCH
BY
ATTORNEY Patented Oct. 20, 1936

2,058,010

UNITED STATES PATENT OFFICE 2,058,010

GASKET

Ellery R. Fitch, Irwin, Pa., assignor to The Westinghouse Air Brake Company, Wilmerding, Pa., a corporation of Pennsylvania Application August 4, 1934, Serial No. 738,492

1 Claim. (Cl. 288—1)

This invention relates to gaskets and more particularly to a gasket that is adapted to make a tight joint between two members having a plurality of connecting openings for the passage of fluid under pressure, or between two members containing chambers that are separated by a portion of the gasket which portion acts as a diaphragm subject to the pressures within the two chambers.

With a gasket of the above indicated character it has heretofore been customary to provide beads extending from one side and to apply the covers, or metal parts that engage the gasket, with sufficient pressure by the use of bolts, or otherwise, to effect a considerable compression of the beads. The beads, when so compressed, not only produce a tight seal on the side of the gasket from which they extend but also force the opposite side of the gasket against the metal face engaging it with sufficient force to form a tight seal and prevent leakage.

When the covers and castings engaging the opposite sides of the gasket are made of cast iron of sufficient strength to prevent them from springing when pressure is applied, and when the gasket engaging faces of the castings are machined to a smooth surface, the above described construction generally provides a sufficiently tight seal. However, die castings are now used to a considerable extent as the members between which the gasket is positioned. These die castings are not usually machined and the faces against which the gasket seals are not as smooth as machined surfaces, but are somewhat irregular. The die castings have low and high spots thereon on the surface caused by the flow of metal during the process of manufacture. These low and high spots may be so small as not to be visible to the naked eye, but are, nevertheless, large enough to cause leakage. Also, when die cast covers are used they are generally not as heavy as cast iron covers and have been found to spring slightly when sufficient pressure is applied, thus producing another cause of leakage.

I have found that gaskets of the above character may be successfully used between, and in engagement with, the surfaces of members formed by die casting by providing a small, or phantom, bead directly under the full bead on the opposite side of the gasket. These small beads cut down the area over which the load is applied, that is, when the gasket is compressed the load is on the bead, instead of on a relatively large area of the gasket, until the small beads are compressed, and when these small beads are so compressed enough pressure is being applied to seal the gasket although the metal plate may have some irregularities. By providing that the phantom bead extends from the surface of the gasket directly opposite to the full bead, and that it is of a size substantially less than that of the full bead, say having one-half the width and one-half the height of the full bead, a sufficiently continuous support is given to this side of the gasket to prevent the material of the gasket from sliding, or flowing, into the openings in the members between which it is held.

It is an object of my invention to provide a gasket that is adapted to make a tight seal on both sides thereof when applied between unmachined or somewhat rough surfaces.

It is a further object of my invention to provide a gasket having full beads extending from one surface thereof, and phantom or small sized beads extending from the opposite surface thereof.

Other objects and advantages of my invention will appear from the following description of one specific embodiment thereof when taken together with reference to the accompanying drawing.

In the accompanying drawing,

Fig. 1 is a plan view of a gasket showing the side of the gasket that is provided with full beads, Fig. 2 is a view of the opposite side of the same gasket showing the phantom beads, and Fig. 3 is a sectional view taken along the line 3—3 of Fig. 1.

Referring to the drawing the three figures illustrate a gasket 1 having openings 2 and 3 therein for registering with openings in the members between which the gasket is to be positioned and with a diaphragm portion 4 that serves to separate chambers in the two members between which the gasket is positioned. The gasket is provided, on one side, with one or more full beads 5, that extend about the connecting openings between the gasket engaging members, for aiding in forming a tight seal or joint between the inner area of the openings, that is subject to high pressure, and the outer edge of the gasket engaging members. On the opposite side of the gasket phantom beads 6 are provided, corresponding in configuration to the full beads 5, and extending directly from the opposite side of the gasket from the full beads 5.

It will be apparent that by constructing the gasket in accordance with my invention the gasket will provide a tight seal between two members between which it is positioned, even though the engaging surfaces or faces thereof are somewhat rough.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A gasket adapted to form a seal between two members having registered openings and having unmachined or somewhat rough or irregular gasket engaging surfaces, said gasket having raised deformable portions on opposite sides thereof, the two raised portions being positioned directly opposite to each other and extending along like continuous paths on the surface of the gasket, the raised deformable portions on one side of the gasket having a relatively large cross-sectional area to constitute full beads, the raised deformable portions directly opposite having a cross-sectional area substantially less than that of the full beads to form phantom beads, whereby the load on the gasket increases in steps, the full bead determining an area of increasing load and the phantom bead determining the area of greatest or maximum load.

ELLERY R. FITCH.